US008598824B2

(12) United States Patent
Ito et al.

(10) Patent No.: US 8,598,824 B2
(45) Date of Patent: Dec. 3, 2013

(54) MOTOR DRIVE CIRCUIT

(75) Inventors: Tatsuo Ito, Ota (JP); Yuji Uchiyama, Ota (JP)

(73) Assignee: ON Semiconductor Trading Ltd., Hamilton (BM)

( * ) Notice: Subject to any disclaimer, the term of this patent is extended or adjusted under 35 U.S.C. 154(b) by 221 days.

(21) Appl. No.: 13/191,972

(22) Filed: Jul. 27, 2011

(65) Prior Publication Data
US 2012/0194114 A1    Aug. 2, 2012

(30) Foreign Application Priority Data
Jul. 29, 2010    (JP) .................. 2010-170778

(51) Int. Cl.
*H02P 7/00*    (2006.01)
*H02K 17/32*    (2006.01)

(52) U.S. Cl.
USPC ...... 318/434; 318/254; 318/293; 318/400.03; 318/400.13

(58) Field of Classification Search
USPC ............... 318/434, 254, 293, 696, 400.03, 318/400.13, 400.34, 400.35
See application file for complete search history.

(56) References Cited

U.S. PATENT DOCUMENTS

| | | | | |
|---|---|---|---|---|
| 3,990,108 A * | 11/1976 | Suga et al. | ............... | 360/73.13 |
| 4,321,519 A * | 3/1982 | Ueda et al. | ................ | 318/696 |
| 4,599,005 A * | 7/1986 | Kawamura et al. | ........... | 368/157 |
| 5,233,329 A * | 8/1993 | Lippmann et al. | ........... | 340/438 |
| 5,731,670 A * | 3/1998 | Galbiati et al. | .......... | 318/400.35 |
| 6,166,501 A * | 12/2000 | Furuki et al. | ............. | 318/400.04 |
| 6,196,650 B1 * | 3/2001 | Inagaki | .................... | 318/400.32 |
| 6,316,894 B2 * | 11/2001 | Hashimura | .............. | 318/400.04 |
| 6,650,084 B2 * | 11/2003 | Fujioka et al. | ............. | 318/705 |
| 6,653,831 B2 * | 11/2003 | Friend et al. | ................. | 324/244 |
| 6,833,738 B2 * | 12/2004 | Nakada | .......................... | 327/58 |
| 7,023,157 B2 * | 4/2006 | Fukamizu et al. | ........... | 318/368 |
| 7,053,608 B2 * | 5/2006 | Friend et al. | ................. | 324/244 |
| 7,071,646 B1 * | 7/2006 | Chen et al. | .............. | 318/400.35 |
| 7,129,671 B2 * | 10/2006 | Fukamizu et al. | ........... | 318/685 |
| 7,531,976 B2 * | 5/2009 | Fukamizu et al. | ....... | 318/400.34 |
| 7,609,015 B2 * | 10/2009 | Okui | ........................ | 318/400.21 |
| 7,706,111 B2 * | 4/2010 | Shimazaki et al. | ............. | 361/29 |
| 7,719,250 B2 * | 5/2010 | Komiya | ........................ | 323/285 |
| 7,768,226 B2 * | 8/2010 | Fukamizu et al. | ........... | 318/700 |
| 7,843,674 B2 * | 11/2010 | Uchiyama | ....................... | 361/89 |
| 7,855,521 B2 * | 12/2010 | Otaguro | ............................. | 318/4 |

(Continued)

FOREIGN PATENT DOCUMENTS

JP    2005-094925    4/2005

*Primary Examiner* — Paul Ip
(74) *Attorney, Agent, or Firm* — SoCal IP Law Group LLP; Steven C. Sereboff; John E. Gunther

(57) ABSTRACT

A motor drive circuit includes: a drive circuit configured to drive a motor whose coil current decreases with increase in counter electromotive voltage of a motor coil; a detection circuit configured to detect whether or not a current value of the coil current is greater than a predetermined value; a first control circuit configured to control the drive circuit so that the current value of the coil current becomes smaller than or equal to the predetermined value, when it is detected that the current value of the coil current is greater than the predetermined value; and a second control circuit configured to control the first control circuit so that the first control circuit does not control the drive circuit based on a detection result of the detection circuit until a predetermined time has elapsed from a start of supply of the coil current.

7 Claims, 4 Drawing Sheets

(56) References Cited

U.S. PATENT DOCUMENTS

| | | | |
|---|---|---|---|
| 7,855,523 B2* | 12/2010 | Kuwamura | 318/400.25 |
| 7,859,205 B2* | 12/2010 | Mori et al. | 318/379 |
| 7,863,840 B2* | 1/2011 | Tanabe et al. | 318/293 |
| 8,018,189 B2* | 9/2011 | Narumi et al. | 318/400.35 |
| 8,084,971 B2* | 12/2011 | Kuwamura | 318/400.13 |
| 8,278,852 B2* | 10/2012 | Motoki et al. | 318/400.13 |
| 8,299,836 B2* | 10/2012 | Sakurai et al. | 327/333 |
| 2002/0125853 A1* | 9/2002 | Fujioka et al. | 318/705 |
| 2002/0167342 A1* | 11/2002 | Nakada | 327/58 |
| 2004/0056628 A1* | 3/2004 | Kandori | 318/650 |
| 2005/0134211 A1* | 6/2005 | Fukamizu et al. | 318/696 |
| 2005/0144539 A1* | 6/2005 | Orita | 714/48 |
| 2005/0146303 A1* | 7/2005 | Fukamizu et al. | 318/696 |
| 2007/0092232 A1* | 4/2007 | Fujii | 388/814 |
| 2007/0194730 A1* | 8/2007 | Fukamizu et al. | 318/254 |
| 2007/0194731 A1* | 8/2007 | Fukamizu et al. | 318/254 |
| 2007/0216325 A1* | 9/2007 | Fukamizu et al. | 318/254 |
| 2008/0012545 A1* | 1/2008 | Komiya | 323/282 |
| 2008/0036407 A1* | 2/2008 | Okui | 318/434 |
| 2008/0231219 A1* | 9/2008 | Mori et al. | 318/434 |
| 2008/0239594 A1* | 10/2008 | Shimazaki et al. | 361/23 |
| 2008/0252238 A1* | 10/2008 | Otaguro | 318/400.05 |
| 2008/0297959 A1* | 12/2008 | Tanabe et al. | 361/33 |
| 2009/0121665 A1* | 5/2009 | Kuwamura | 318/400.13 |
| 2010/0176758 A1* | 7/2010 | Motoki et al. | 318/400.13 |

* cited by examiner

MOTOR DRIVE CIRCUIT

CROSS-REFERENCE TO RELATED APPLICATION

This application claims the benefit of priority to Japanese Patent Application No. 2010-170778, filed Jul. 29, 2010, of which full contents are incorporated herein by reference.

BACKGROUND OF THE INVENTION

1. Field of the Invention

The present invention relates to a motor drive circuit.

2. Description of the Related Art

A counter electromotive voltage of a motor coil in a common DC motor rises with rise in rotation speed of the motor. Thus, a coil current flowing through the motor coil increases at starting of the motor and then decreases, as illustrated in FIG. 4, for example. However, even during a steady period after the rotation speed of the motor has become constant, for example, if the motor is locked, the rotation speed of the motor is decreased, which may result in a great coil current flow. Thus, a motor drive circuit may be provided with a current limit circuit configured to compare a current value of the coil current with a predetermined current value and cause the current value of the coil current to be lower than or equal to the predetermined current value (See Japanese Patent Laid-Open Publication No. 2005-94925, for example). That is, if the current value of the coil current reaches the predetermined current value (hereinafter referred to as a current limit value), the motor drive circuit drives the motor coil so that the current value of the coil current is smaller than or equal to the current limit value, for example.

If the current limit value is determined on the basis of a current value for flowing during a steady period, generally the current value of the coil current results in the current limit value at starting. In this case, since the coil current is controlled so that the current value thereof is smaller than or equal to the current limit value, torque required for rotating the motor cannot be ensured, resulting that the motor might not rotate.

Thus, a microcomputer may be controlled so that the current limit value is set high while the motor is being started and is set low in a steady period, for example. In this case, however, the microcomputer has to change the current limit value every time the motor is started, which causes such a problem that the microcomputer is put under a load.

SUMMARY OF THE INVENTION

A motor drive circuit according to an aspect of the present invention, includes: a drive circuit configured to drive a motor whose coil current decreases with increase in counter electromotive voltage of a motor coil; a detection circuit configured to detect whether or not a current value of the coil current is greater than a predetermined value; a first control circuit configured to control the drive circuit so that the current value of the coil current becomes smaller than or equal to the predetermined value, when it is detected that the current value of the coil current is greater than the predetermined value; and a second control circuit configured to control the first control circuit so that the first control circuit does not control the drive circuit based on a detection result of the detection circuit until a predetermined time has elapsed from a start of supply of the coil current.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
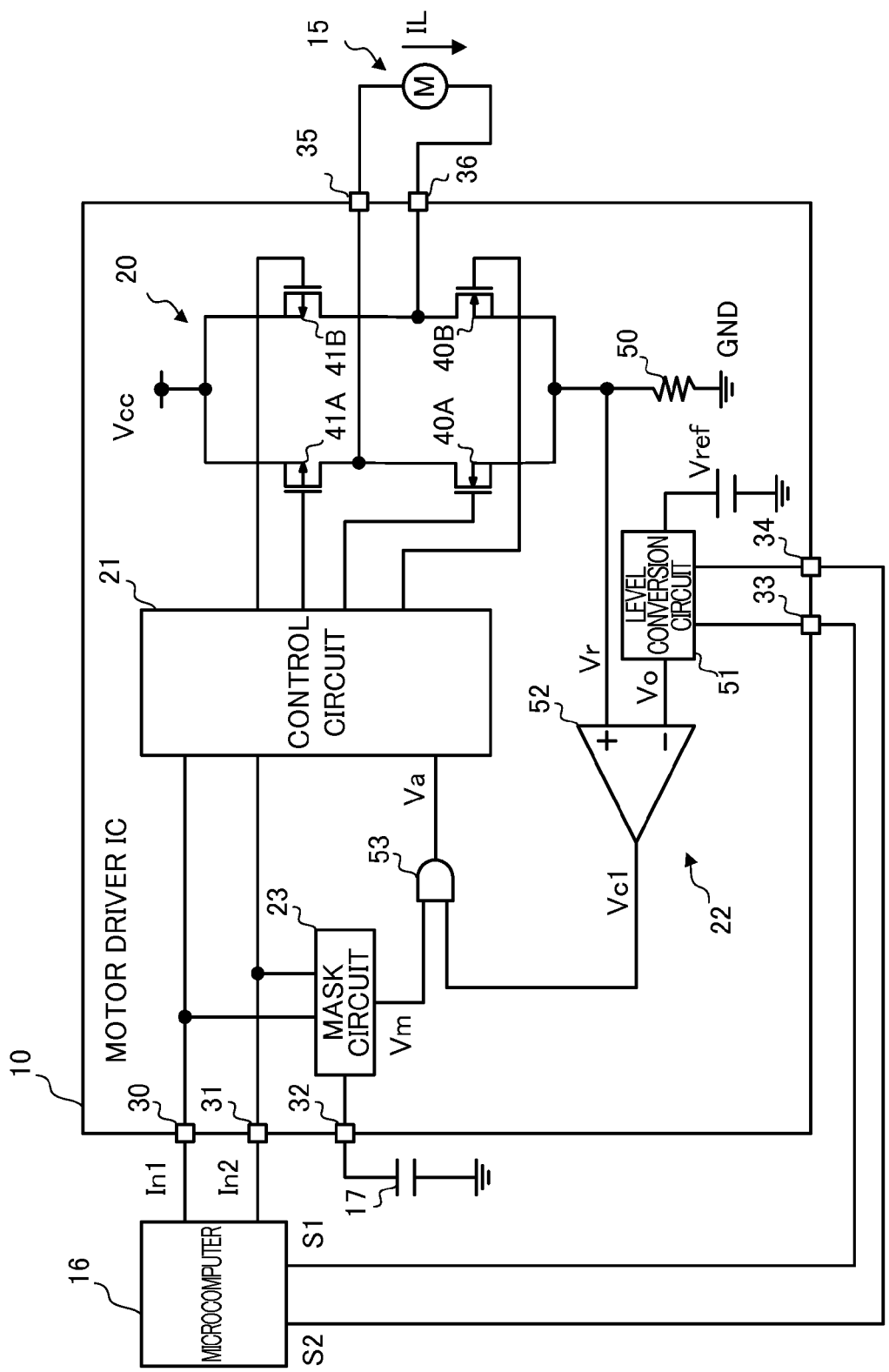
FIG. 1 is a diagram illustrating a configuration of a motor driver IC 10 according to an embodiment of the present invention.

FIG. 1 is a diagram illustrating a configuration of a motor driver IC 10 according to an embodiment of the present invention. The motor driver IC 10 (motor drive circuit) is a circuit configured to drive a motor 15 on the basis of an instruction of a microcomputer 16, and includes a drive circuit 20, a control circuit 21, a current limit circuit 22, a mask circuit 23, and terminals 30 to 36.

The motor 15 is a brush DC motor connected between the terminals 35 and 36, and rotates in accordance with a voltage across the motor 15, for example. Specifically, the motor rotates normally, when the voltage at the terminal 35 is substantially equal to a supply voltage Vcc, and the voltage at the terminal 36 is substantially equal to a voltage of ground GND. On the other hand, the motor rotates reversely, when the voltage at the terminal 36 is substantially equal to the supply voltage Vcc, and the voltage of the terminal 35 is substantially equal to the voltage of the ground GND. When both voltages of the terminals 35 and 36 are substantially equal to the voltage of the ground GND, the motor 15 is brought into a brake state, resulting in reduction in the rotation speed of the motor 15. Moreover, when the terminals 35 and 36 are in a high impedance state, the motor 15 is in a so-called standby state.

In an embodiment of the present invention, a coil current flowing through a motor coil (not shown) of the motor 15 is referred to as IL. Also, in FIG. 1, illustrated is a direction of the flow of the coil current IL when the motor 15 rotates normally.

The microcomputer 16 outputs signals In1 and In2 to instruct normal rotation, reverse rotation or the like of the motor 15 and signals S1 and S2 to set a current value that is used as a reference against which to determine whether the current value of the coil current IL is a predetermined value (hereinafter referred to as a current limit value). The signals In1, In2, S1 and S2 are logic level signals.

The drive circuit 20 is an H-bridge circuit configured to directly drive the motor 15 on the basis of the output from a control circuit 21, and includes NMOS transistors 40A and 40B and PMOS transistors 41A and 41B.

The control circuit 21 controls on/off of the NMOS transistor 40A and the like in the H-bridge circuit, on the basis of the signals In1 and In2, which are inputted through the terminals 30 and 31, and a voltage Va, which is outputted from a current limit circuit 22 and indicates whether the current value of the coil current IL is greater than the current limit value. The control circuit 21 turns on/off the NMOS transistor 40A and the like on the basis of the signals In1 and In2, if the voltage Va is at a low level (hereinafter referred to as low). Although details will be described later, if the voltage Va is low, the current value of the coil current IL is lower than the current limit value, which is a case where the current limit is not detected. Here, the detection of the current limit indicates such detection that the current value of the coil current IL reaches the current limit value.

The control circuit 21 turns off all the NMOS transistors 40A and the like included in the H-bridge circuit, if both the signals In1 and In2 are low. As a result, the motor 15 enters the standby state. A state where the signal In1 is low and the signal In2 is low is hereinafter referred to as (In1, In2)=(L, L).

In the case of (In1, In2)=(H, L), the control circuit 21 turns on a PMOS transistor 41A and an NMOS transistor 40B, and turns off a PMOS transistor 41B and the NMOS transistor 40A. As a result, the voltage of the terminal 35 is substantially equal to the supply voltage Vcc and the terminal 36 is grounded through ON resistance of the NMOS transistor 40B and a resistor 50, which causes the motor 15 to rotate normally.

In the case of (In1, In2)=(L, H), the control circuit 21 turns on the PMOS transistor 41B and the NMOS transistor 40A and turns off the PMOS transistor 41A and the NMOS transistor 40B. As a result, the voltage of the terminal 36 is substantially equal to the supply voltage Vcc and the terminal 35 is grounded through the ON resistance of the NMOS transistor 40A and the resistor 50, which causes the motor 15 to rotate reversely. In the case of (In1, In2)=(H, H), the control circuit 21 turns off the PMOS transistors 41A and 41B, and turns on the NMOS transistors 40A and 40B. As a result, the voltages of the terminals 35 and 36 are substantially equal to the voltage of the ground GND, which causes the motor 15 to enter the braked state.

If the voltage Va is high, that is, if a current limit is detected, the control circuit 21 performs switching for the NMOS transistor 40A and the like included in the H-bridge circuit so that the current value of the coil current IL is lower than or equal to the current limit value regardless of the level of the signals In1 and In2. The control circuit 21 and an AND circuit 53, which will be described later, correspond to a first control circuit.

The current limit circuit 22 (detection circuit) is a circuit configured to detect whether the current value of the coil current IL is greater than the current limit value, and includes the resistor 50, a level conversion circuit 51, a comparator 52, and the AND circuit 53.

The resistor 50 is a so-called current detection resistor, and converts the coil current IL into a voltage Vr. Thus, the voltage Vr is changed similarly to the coil current IL.

The level conversion circuit 51 (voltage output circuit) converts the level of a reference voltage Vref at a predetermined level based on the signals S1 and S2, which are inputted through the terminals 33 and 34, and outputs the result. The reference voltage Vref is a voltage to be used as a reference, against which to determine whether the current value of the coil current IL reaches the current limit value, in the steady state, for example.

The level conversion circuit 51 outputs, e.g., the reference voltage Vref in the case of (S1, S2)=(L, L), and outputs, e.g., Vref×¾ in the case of (S1, S2)=(H, L). Here, it is assumed that a voltage level of the reference voltage Vref is Vref. Also, the level conversion circuit 51 outputs, e.g., Vref×⅔ in the case of (S1, S2)=(L, H), and outputs, e.g., Vref×¼ in the case of (S1, S2)=(H, H).

The level conversion circuit 51, which is configured to output a voltage of a level variable according to the signals S1 and S2, can be realized by an AD converter and a voltage dividing circuit, which is configured to divide the reference voltage Vref in a voltage dividing ratio that is in accordance with the signals S1 and S2, for example. Thus, in an embodiment of the present invention, a coefficient, such as "¾" as described above, by which the reference voltage Vref is multiplied, can be freely set in advance.

The comparator 52 is configured to compare levels between the voltage Vr and a voltage Vo outputted from the level conversion circuit 51. When the voltage Vr is higher in level than the voltage Vo, the comparator 52 detects that the current value of the coil current IL is higher than the current limit value, thereby outputting a high level voltage Vc1. On the other hand, when the voltage Vr is lower in level than the voltage Vo, the comparator 52 detects that the current value of the coil current IL is lower than the current limit value, thereby outputting the low level voltage Vc1.

The AND circuit 53 is configured to perform a logical AND of a mask voltage Vm outputted from the mask circuit 23 and the voltage Vc1, and outputs a voltage Va indicating the calculation result. Therefore, if the mask voltage Vm is low, the voltage Va is low regardless of the level of the voltage Vc1. On the other hand, if the mask voltage Vm is at a high level (hereinafter referred to as high), the voltage Va is changed similarly to the voltage Vc1. That is, if the mask voltage Vm is low, the voltage Va is low regardless of the level of the voltage Vc1.

Figure 2:
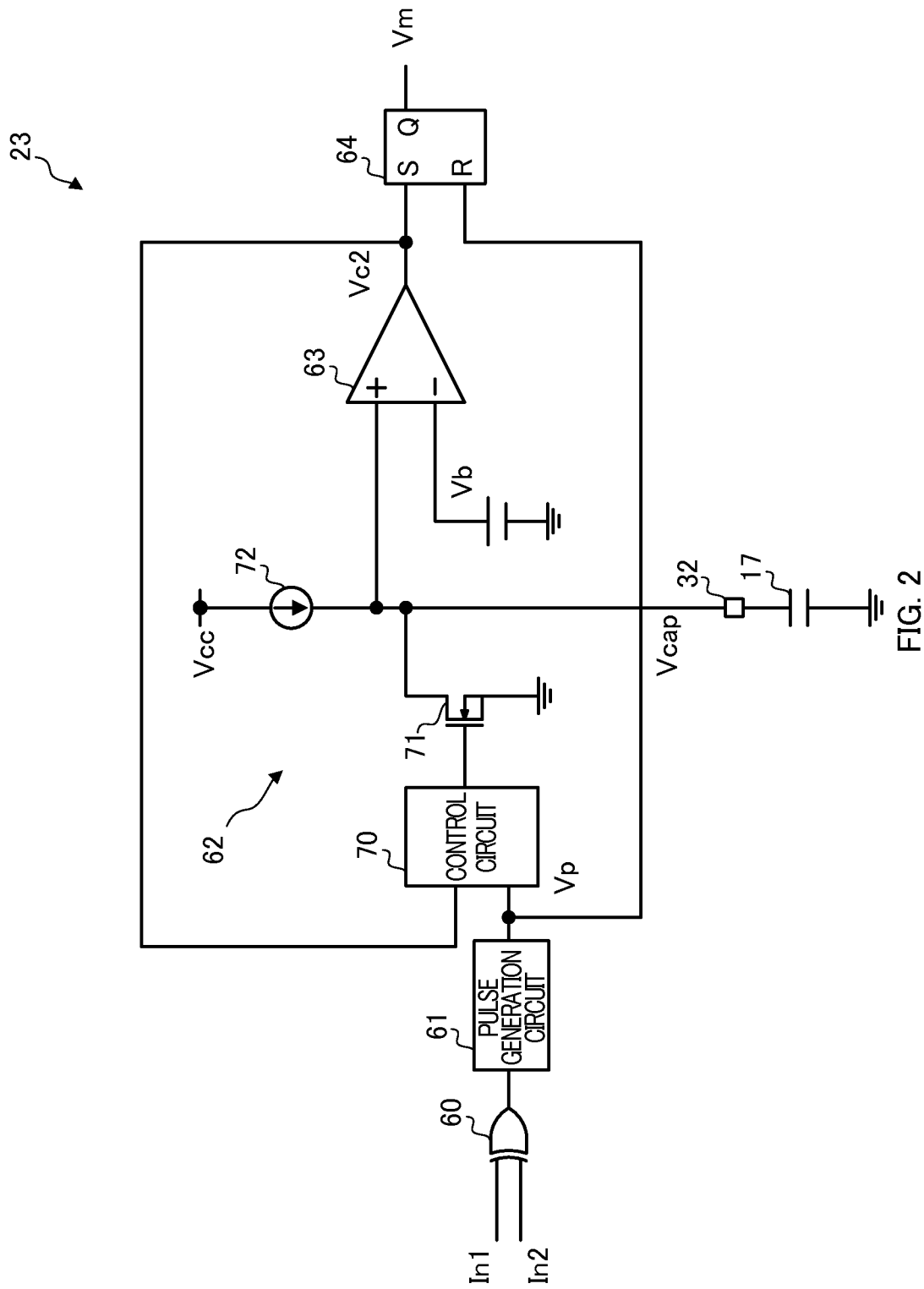
FIG. 2 is a diagram illustrating an embodiment of a mask circuit 23.

The mask circuit 23 (second control circuit) outputs the low level voltage Vm only for a predetermined time TA if the signal In1 or In2 to rotate the motor 15 normally or reversely is inputted thereto, and masks change in the voltage Vc1. The mask circuit 23 includes, as illustrated in FIG. 2, an EOR circuit 60, a pulse generation circuit 61, a charging/discharging circuit 62, a comparator 63, and an SR flip-flop 64. The predetermined time TA is assumed to be a time period longer than a time period from starting of the motor 15 until a time when the rotation speed has become constant, for example.

The EOR circuit 60 performs an exclusive logical OR of the signals In1 and In2, and outputs the result thereof. Thus, if either of the signals In1 and In2 is high, that is, if an instruction for normal rotation or reverse rotation is outputted from the microcomputer 16, the output of the EOR circuit 60 is high.

The pulse generation circuit 61 outputs a pulse signal Vp which goes high if the output of the EOR circuit 60 goes high.

The charging/discharging circuit 62 (charging circuit) is a circuit configured to charge/discharge a capacitor 17 connected through the terminal 32, and include a control circuit 70, an NMOS transistor 71, and a current source 72. Specifically, the charging/discharging circuit 62 is configured to charge the capacitor 17 if the high level pulse signal Vp is outputted, and discharge the capacitor 17 if a voltage Vc2 outputted from the comparator 63 goes high.

The control circuit 70 is configured to turn off the NMOS transistor 71 if the high level pulse signal Vp is outputted thereto, and turn on the NMOS transistor 71 if the voltage Vc2 outputted from the comparator 63 thereto is goes high.

A drain of the NMOS transistor 71 is connected to the terminal 32, and a constant current from the current source 72 is supplied to the capacitor 17 through the terminal 32. Thus, if the NMOS transistor 71 is ON, a charging voltage Vcap of the capacitor 17 is substantially equal to the voltage of the ground GND. On the other hand, if the NMOS transistor 71 is OFF, since the capacitor 17 is charged with the constant current, the charging voltage Vcap is gradually raised.

The comparator 63 (determination circuit) is configured to compare the charging voltage Vcap with a predetermined voltage Vb, and detect whether or not the predetermined time TA has elapsed since the starting of the motor 15. Specifically, if the charging voltage Vcap becomes higher than the voltage Vb, the comparator 63 detects that the predetermined time TA has elapsed since the starting of the motor 15, and sets the voltage Vc2 at high. If the voltage Vc2 goes high, the NMOS transistor 71 is turned on as described above, resulting that the capacitor 17 is discharged.

The SR flip-flop 64 (third control circuit) is configured to cause the voltage Vm outputted from a Q output to go low, if the pulse signal Vp goes high, that is, an instruction for rotating the motor 15 normally or reversely is outputted thereto. On the other hand, the SR flip-flop 64 is configured to cause the voltage Vm to go high, if the voltage Vc2 goes high, that is, the predetermined time TA has elapsed since the starting of the motor 15. As such, if an instruction for rotating the motor 15 normally or reversely is inputted, the mask circuit 23 outputs the low level voltage Vm for the predetermined time TA, and masks change in the voltage Vc1.

==Operation of Motor Driver IC 10==

An operation of the motor driver IC 10 will be described referring to FIG. 3. Here, the microcomputer 16 outputs (In1, In2)=(H, L) so as to rotate the motor 15 normally at time t0. The level conversion circuit 51 is assumed to be output the reference voltage Vref as the voltage Vo. In an embodiment of the present invention, it is also assumed that the motor driver IC 10, in which a rated current is sufficiently greater than the coil current IL at starting, is employed, for example. Further, in an embodiment according to the present invention, it is assumed that an overcurrent detection circuit (not shown) configured to cause the control circuit 21 to turn off all the NMOS transistors 40A and the like in the H-bridge circuit if the coil current IL reaches the rated current, is included.

First, when (In1, In2)=(H, L) is given at the time to, the PMOS transistor 41A and the NMOS transistor 40B are turned on, and supply of the coil current IL is started. Also, since the pulse signal Vp goes high, charging of the capacitor 17 is started, and the charging voltage Vcap rises. Moreover, since the SR flip-flop 64 is reset, the voltage Vm is kept low.

If the supply of the coil current IL is started, the coil current IL increases, thereby increasing the voltage Vr as well. At time t1, for example, since the voltage Vr becomes higher than the voltage Vref, the current limit is detected, and the high level voltage Vc1 is outputted. However, the voltage Vc1 has been masked until the predetermined time TA has elapsed since the time t0, and thus the coil current IL continues to rise.

Figure 3:
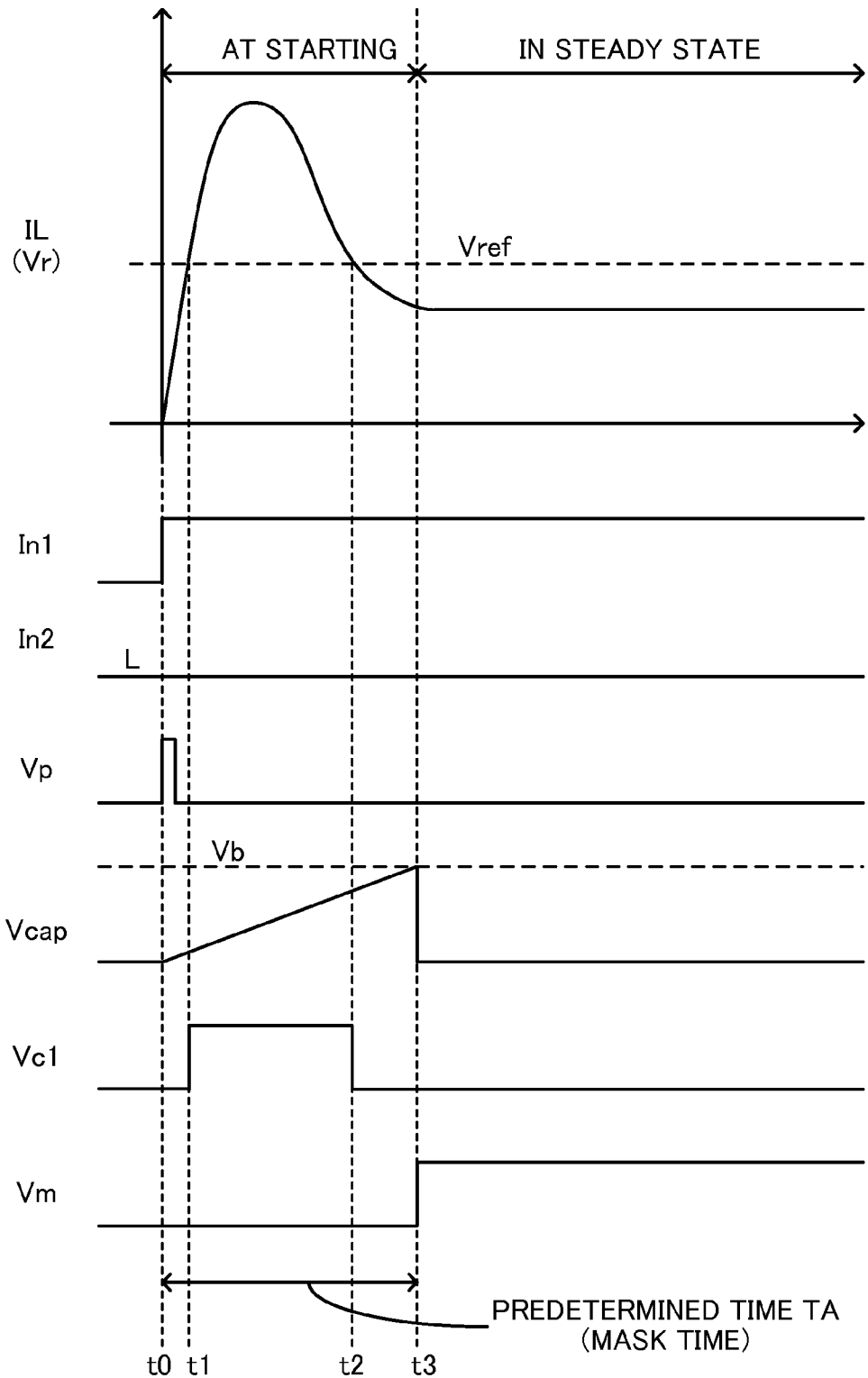
FIG. 3 is a diagram illustrating a coil current IL and major waveforms of a motor driver IC 10 when normal rotation of a motor 15 is started.

If the motor 15 starts rotating, a counter electromotive voltage of the motor coil gradually rises, which causes the coil current IL to rise and thereafter fall as illustrated in FIG. 3. At time t2, for example, since the voltage Vr becomes lower than the voltage Vref, the voltage Vc1 goes low.

At time t3 when the predetermined time TA has elapsed since the time t0, the charging voltage Vcap reaches the voltage Vb, and the voltage Vm goes high. That is, at the time t3, mask of the voltage Vc1 is cancelled. Thus, if the current limit is detected at the time t3 and thereafter, the control circuit 20 performs switching for the NMOS transistor 40A and the like included in the H-bridge circuit so that the current value of the coil current IL is lower than or equal to the current limit value.

The motor driver IC 10 according to an embodiment of the present invention has, hereinabove, been described above.

Figure 4:
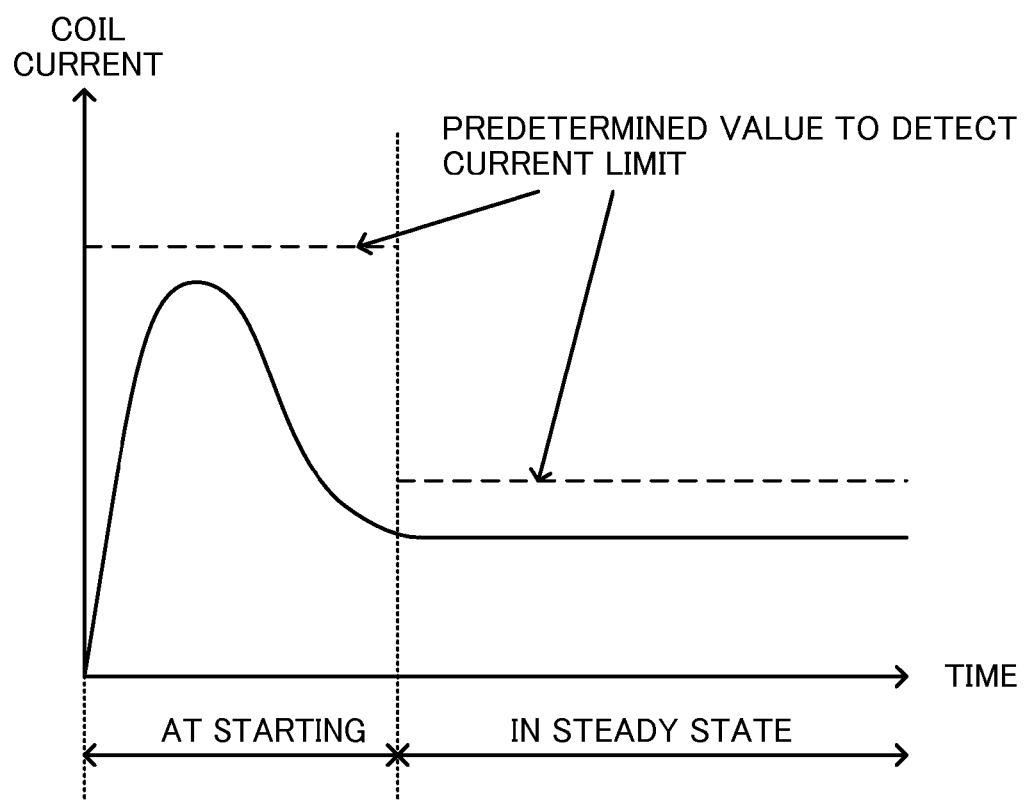
FIG. 4 is a diagram illustrating a waveform of a general coil current at starting of a DC motor.

The mask circuit 23 controls the control circuit 21 such that the control circuit 21 does not perform switching for the NMOS transistor 40A and the like based on a detection result of the current limit circuit until the predetermined time TA has elapsed since the start of the supply of the coil current IL. Thus, in an embodiment of the present invention, it is not necessary to raise the reference voltage Vref, as illustrated in FIG. 4, for example, in order to detect the current limit in the steady state. That is, the microcomputer 16 does not have to raise the reference voltage Vref every time the motor 15 is started, thereby reducing a load of the microcomputer 16.

Also, in an embodiment of the present invention, since the current value of the current source 72, the capacitance value of the capacitor 17 and the like can be determined freely, the predetermined time TA can be varied.

In general, a time period until a time when the rotation speed of the motor 15 has become constant is varied according to the type and the like of the motor 15, for example. In an embodiment of the present invention, the capacitor 17 is a so-called external capacitor connected to the terminal 32. Therefore, a user can set the predetermined time TA optimal for the motor 15 that is to be actually used.

Further, the comparator 52 is configured to detect whether or not the coil current IL is equal to the current limit value on the basis of the levels of the voltage Vr and the reference voltage Vref, for example. Since the voltage Vr is a voltage that changes similarly to the coil current IL, the current limit can be detected with accuracy, in an embodiment of the present invention.

Further, the level conversion circuit 51 is configured to convert the level of the reference voltage Vref on the basis of the signals S1 and S2, and output the result to the comparator 52. Thus, in an embodiment of the present invention, the detection level of the current limit can be changed.

The motor 15 is assumed to be a brush DC motor, for example, but it may be a brushless DC motor.

Further, the drive circuit 20 is assumed to include the NMOS transistors 40A, 40B and the PMOS transistors 41A, 41B, but it is not limited thereto. For example, both the PMOS transistors 41A and 41B may be NMOS transistors. However, in that case, a booster circuit, such as a charge-pump circuit or the like, which is configured to generate a voltage to turn on/off the NMOS transistor disposed on the power supply Vcc side, is required.

Further, a transistor included in the drive circuit 20 may be a bipolar transistor or the like.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A motor drive circuit comprising:
  a drive circuit configured to drive a motor whose coil current decreases with increase in counter electromotive voltage of a motor coil;
  a detection circuit configured to detect whether or not a current value of the coil current is greater than a predetermined value;
  a first control circuit configured to control the drive circuit so that the current value of the coil current becomes smaller than or equal to the predetermined value, when it is detected that the current value of the coil current is greater than the predetermined value; and
  a second control circuit configured to control the first control circuit so that the first control circuit does not control the drive circuit based on a detection result of the detection circuit until a predetermined time has elapsed from a start of supply of the coil current, the second control circuit including:

a charging circuit configured to charge a capacitor with a constant current when the supply of the coil current is started;

a determination circuit configured to determine that the predetermined time has elapsed, when a charging voltage of the capacitor has reached a predetermined voltage, the predetermined voltage being in accordance with the predetermined time; and a third control circuit configured to operate the first control circuit based on a detection result of the detection circuit when the determination circuit determines that the predetermined time has elapsed.

2. The motor drive circuit according to claim 1, wherein the motor drive circuit is an integrated circuit and includes a terminal connected with the capacitor.

3. The motor drive circuit according to claim 2, wherein the detection circuit includes:

a resistor configured to convert the coil current into a voltage; and a comparison circuit configured to compare the current value of the coil current with the predetermined value, based on a voltage generated in the resistor and a reference voltage, the reference voltage being in accordance with the predetermined value.

4. The motor drive circuit according to claim 3, further comprising:

a voltage output circuit configured to change the level of the reference voltage and output a voltage obtained by changing the level thereof to the comparison circuit based on data for changing the predetermined value.

5. The motor drive circuit according to claim 1, wherein the detection circuit includes:

a resistor configured to convert the coil current into a voltage; and a comparison circuit configured to compare the current value of the coil current with the predetermined value, based on a voltage generated in the resistor and a reference voltage, the reference voltage being in accordance with the predetermined value.

6. The motor drive circuit according to claim 5, further comprising:

a voltage output circuit configured to change the level of the reference voltage and output a voltage obtained by changing the level thereof to the comparison circuit based on data for changing the predetermined value.

7. A motor drive circuit comprising:

a drive circuit configured to drive a motor whose coil current decreases with increase in counter electromotive voltage of a motor coil;

a detection circuit configured to detect whether or not a current value of the coil current is greater than a predetermined value;

a first control circuit configured to control the drive circuit so that the current value of the coil current becomes smaller than or equal to the predetermined value, when it is detected that the current value of the coil current is greater than the predetermined value; and a second control circuit configured to control the first control circuit so that the first control circuit does not control the drive circuit based on a detection result of the detection circuit until a predetermined time has elapsed from a start of supply of the coil current, the second control circuit including:

a determination circuit configured to determine that the predetermined time has elapsed, when a voltage that rises when the supply of the coil current is started has reached a predetermined voltage, the predetermined voltage corresponding to the predetermined time, and a third control circuit configured to operate the first control circuit based on a detection result of the detection circuit when the determination circuit determines that the predetermined time has elapsed.

* * * * *